(12) United States Patent
Arya et al.

(10) Patent No.: US 6,262,868 B1
(45) Date of Patent: Jul. 17, 2001

(54) METHOD AND STRUCTURES USED FOR CONNECTING RECORDING HEAD SIGNAL WIRES IN A MICROACTUATOR

(75) Inventors: Satya Prakash Arya; Long-Sheng Fan; Toshiki Hirano; Tzong-Shii Pan; Wing Chun Shum, all of San Jose; Timothy Clark Reiley, Los Gatos, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/000,940

(22) Filed: Dec. 30, 1997

(51) Int. Cl.[7] ...................................................... G11B 5/48
(52) U.S. Cl. .............................................................. 360/290
(58) Field of Search ...................................... 360/104, 106

(56) References Cited

U.S. PATENT DOCUMENTS 5,867,347 * 2/1999 Knight et al. ........................ 360/104

* cited by examiner

Primary Examiner—George J. Letscher

(74) Attorney, Agent, or Firm—Thomas R. Berthold; Banner & Witcoff, Ltd.

(57) ABSTRACT

A rotary microactuator includes a stationary structure formed on a substrate, a movable structure, and at least a pair of wires connected to the movable structure that conduct a signal associated with the movable structure. Each wire of the pair of wires has a first end that is connected in a cantilever manner to the substrate and a second end that is connected to the movable structure. The wires each have a serpentine shape between the first end and the second end, a predetermined spring stiffness, and a predetermined electrical characteristic. The microactuator also includes a magnetic head slider that is attached to the movable structure, and at least another pair of wires conducting a signal associated with a magnetic head of the slider. Each of the another pair of wires has a first end that is connected in a cantilever manner to the substrate and a second end that is connected to the movable structure. Like the first pair of wires, each of the another pair of wires has a serpentine shape between the first end and the second end of the wire. Electronic circuitry for conditioning the electrical signals associated with the magnetic head can be fabricated as part of the substrate and be connected to one of the pair of wires. The electronic circuitry can, for example, amplify electrical drive signals associated with the magnetic head, be a recording sensor preamplifier, and/or provide ESD protection for the electrical signals associated with the magnetic head.

18 Claims, 10 Drawing Sheets

METHOD AND STRUCTURES USED FOR CONNECTING RECORDING HEAD SIGNAL WIRES IN A MICROACTUATOR

CROSS-REFERENCE TO RELATED APPLICATIONS

The present application is related to a patent application entitled "Shielded Electrostatic Microactuators for Magnetic-Head Positioning and Related Multilayer Technology For Fabricating Such Devices," Ser. No. 09/000,958, now U.S. Pat. No. 5,959,808, invented by Long-Shen Fan et al.; a patent application entitled "Integrated 3D Limiters For Microactuators," Ser. No. 09/000,554, now U.S. Pat. No. 6,195,227, invented by Long-Shen Fan et al.; a patent application entitled "Rotary Electrostatic Microactuator With Area-Efficient Comb Electrode Arrangement," Ser. No. 09/000,941, now U.S. Pat. No. 5,995,334, invented by Long-Shen Fan et al.; and a patent application entitled "Rotary Electrostatic Microactuator With Optimum Flexure Arrangement", Ser. No. 09/000,555, now U.S. Pat. No. 5,982,585, invented by Toshiki Hirano et al., each application filed concurrently with the present application and each commonly assigned.

BACKGROUND OF THE INVENTION

1. Field of the Invention

The present invention relates to the field of disk drives. More particularly, the present invention relates to a microactuator for fine positioning a read/write head of a disk drive and a method for making the microactuator.

2. Description of the Related Art

FIG. 1 shows a high RPM disk drive 10 having a two-stage, or piggy-back, servo system for positioning a magnetic read/write head (or a recording slider) over a selected track on a magnetic disk 11. The two-stage servo system includes a voice-coil motor (VCM) 13 for coarse positioning a read/write head suspension 12 and a microactuator, or micropositioner, for fine positioning the read/write head over the selected track. FIG. 2 shows an enlarged exploded view of the read/write head end of suspension 11. An electrostatic rotary microactuator 14 is attached to a gimbal structure 15 on suspension 11, and a slider 16 is attached to the microactuator. A read/write head 17 is fabricated as part of slider 16.

While a disk drive having a two-stage servo system can achieve a very high track density in a cost-effective manner, certain issues must be resolved so that such a two-stage servo system is practical for high volume production. For example, when a piggy-backed microactuator is used for fine positioning a read/write head (or a recording slider), the wires connected to the recording head (or the recording slider) act as springs that oppose the forces generated by the microactuator, thus varying the microactuator frequency response. The variations caused by the wires are non-reproducible from microactuator device to microactuator device. Further, conventional wiring attachment techniques restrict bonding pads associated with a microactuator to be at certain locations, while simultaneously restricting the microactuator to have certain dimensions. Further still, conventional wiring attachment techniques add undesirable mechanical stresses to a microactuator structure during the wire attachment process.

Large electric fields extend between the stationary and movable electrodes and when the electrodes are exposed, and the strong fields generated during operation make dust more likely to collect on the electrodes possibly causing short-circuit failure and/or jamming of the moving structure of the microactuator. Moreover, when high-frequency signals are applied to exposed electrodes, such as in a sensing circuit, cross-talk interference and EMI to near-by circuits are potentially generated.

When a flexure-type microactuator is used to fine position a read/write head (or a recording slider), the microactuator experiences forces along a vertical direction that is normal to the rotational plane of the microactuator. The forces can be large enough to exceed the flexure strength of the microactuator, resulting in permanent deformation or breakage of the flexure. For example, a negative air-bearing force, which forces the recording slider away from the microactuator substrate during unloading, can be greater than 10 g. The recording slider is also exposed to horizontal forces caused by contact friction and air drag, although these particular forces are relatively minor in comparison to the vertical forces experienced by a microactuator. Further, the recording slider may hit asperities on the surface of the disk that causes the slider to rotate around suspension pivot points. All of the slider motions may apply repetitive stresses to the microactuator flexure.

Additionally, it is important for the microactuator to be area-efficient so that the area and mass of the microactuator are minimized. The costs associated with fabricating a microactuator are typically directly proportional to the area of the microactuator, so the smaller the area, the less expensive the microactuator will be. The mass of the microactuator, which is attached to the tip of the suspension, has large effect on the dynamics of the coarse actuator (VCM). Consequently, minimizing the mass of a microactuator favorably impacts the dynamics required of the coarse actuator.

There are two desirable design constraints for designing the comb-electrodes and the beams of a microactuator for producing an area-efficient microactuator. The comb-electrodes are the part of the microactuator structure that produces the electrostatic driving force. The electrodes, also referred to as fingers, are attached to the beams, or electrode branches, that are fixed to both the stationary part and the movable part of a microactuator. For the first design constraint, the longitudinal axis of each finger is preferably oriented at the base of the finger where it attached to a branch to be perpendicular to an imaginary line that connects the base of the finger to the center of the rotation of the microactuator. By so doing, the electrostatic force produced between the electrodes generates a pure torque. For the second design constraint, each electrode branch of the stationary part of a microactuator must be separated from each adjacent branch of the stationary part of the microactuator by a minimum distance along the length of the branches. Similarly, each electrode branch of the movable part of a microactuator must be separated from each adjacent branch of the stationary part by a minimum distance along the length of the branches.

Conventional microactuator designs using a "radial" or a "spoke-like" branch arrangement satisfy the first design constraint. FIG. 3 shows a conventional arrangement 30 of a flexure-type rotary microactuator having stationary branches 31 and movable branches 33. Fingers 32 and 34 are attached to branches 31 and 33, respectively, so that a longitudinal axis of each finger is oriented perpendicularly to an imaginary line that connects the base of the finger to the center of rotation 35. Nevertheless, the separation distance between branches 31 and 33 increases with increasing distance from the center of rotation of the microactuator, resulting in a relatively low area-efficiency.

To make a two-stage servo system for a high-RPM, high-track density disk drive practical for high volume production, what is needed is a wiring technique that provides a precisely-defined spring stiffness and allows contact pads to be placed at any convenient location on a magnetic recording slider. Further, what is needed is a way to shield the electrodes so that dust is not likely to collect on the electrodes and cross-talk interference and EMI to near-by circuits is minimized. Further still, what is needed is a limiter design that confines the stresses applied to a microactuator to low levels, thus avoiding any deformation of a microactuator flexure. Lastly, what is needed is a rotary microactuator having an area-efficient design.

SUMMARY OF THE INVENTION

The present invention provides a wiring technique for a microactuator that provides a precisely-defined spring stiffness and allows contact pads to be placed at any convenient location on a magnetic recording slider. The advantages of the present invention are provided by a rotary microactuator that includes a stationary structure formed on a substrate, a movable structure, and at least a pair of wires connected to the movable structure that conduct a signal associated with the movable structure. According to the invention, each wire of the pair of wires has a first end that is connected in a cantilever manner to the substrate and a second end that is connected to the movable structure. The wires each have a serpentine shape between the first end and the second end, a predetermined spring stiffness, and a predetermined electrical characteristic. The microactuator also includes a magnetic head slider that is attached to the movable structure, and at least another pair of wires conducting a signal associated with a magnetic head of the slider. Each of the another pair of wires has a first end that is connected in a cantilever manner to the substrate and a second end that is connected to the movable structure. Like the first pair of wires, each of the another pair of wires has a serpentine shape between the first end and the second end of the wire. Electronic circuitry for conditioning the electrical signals associated with the magnetic head can be fabricated as part of the substrate and be connected to one of the pair of wires. The electronic circuitry can, for example, amplify electrical drive signals associated with the magnetic head, be a recording sensor preamplifier, and/or provide ESD protection for the electrical signals associated with the magnetic head.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a microactuator having a microfabricated conducting cantilever wire for connecting, for example, a magnetic recording head to a microactuator substrate. The dimensions of the conducting cantilever wire are lithographically-defined so that the spring stiffness associated with the wire is precisely defined and uncertainties associated with the spring stiffness are eliminated. By using conducting cantilever wiring according to the invention, the contact pads are not restricted to be at certain locations on a microactuator substrate as with conventional wiring techniques. For example, connections for a magnetic head can be easily routed on the substrate to any convenient location on the substrate for bonding with a conducting cantilever wire. Further, the space on the substrate made available by using conductive cantilever wires can be used for fabricating signal conditioning circuitry, including, but not limited to, ESD protection, recording head signal amplification and local write head drivers for low loss high-frequency (writing) response.

Further, the present invention provides a microfabricated shielding structure for physically and electrically isolating active electrodes of an electrostatic microactuator, thereby eliminating the possibility of attracting small particles between microactuator electrodes and cross-talk interference and EMI to near-by circuits. The shielding structure of the present invention also provides an electrode stiffener, thus reducing the required minimum electrode width for a microactuator, and thereby increasing the area efficiency and output of the microactuator.

Another aspect of the present invention provides a microfabricated limiter structure for preventing deformation of microactuator flexure. Yet another aspect of the present invention provides an area-efficient microactuator.

Figure 1:
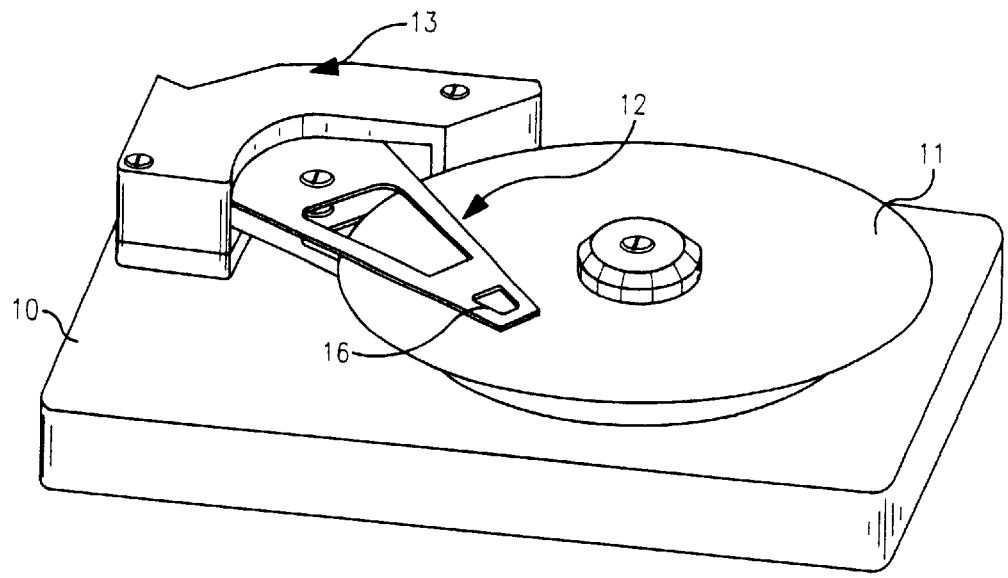
FIG. 1 shows a disk drive having a two-stage servo system for positioning a magnetic read/write head over a selected track on a magnetic disk.
Figure 2:
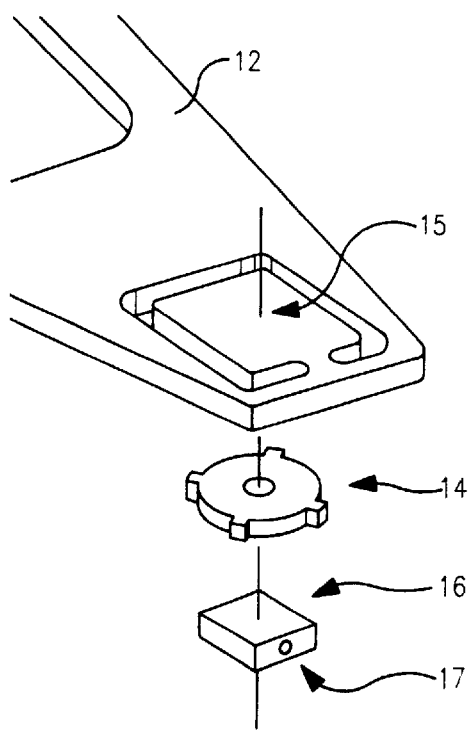
FIG. 2 shows an enlarged exploded view of the read/write head end of the suspension for the disk drive of FIG. 1.
Figure 3:
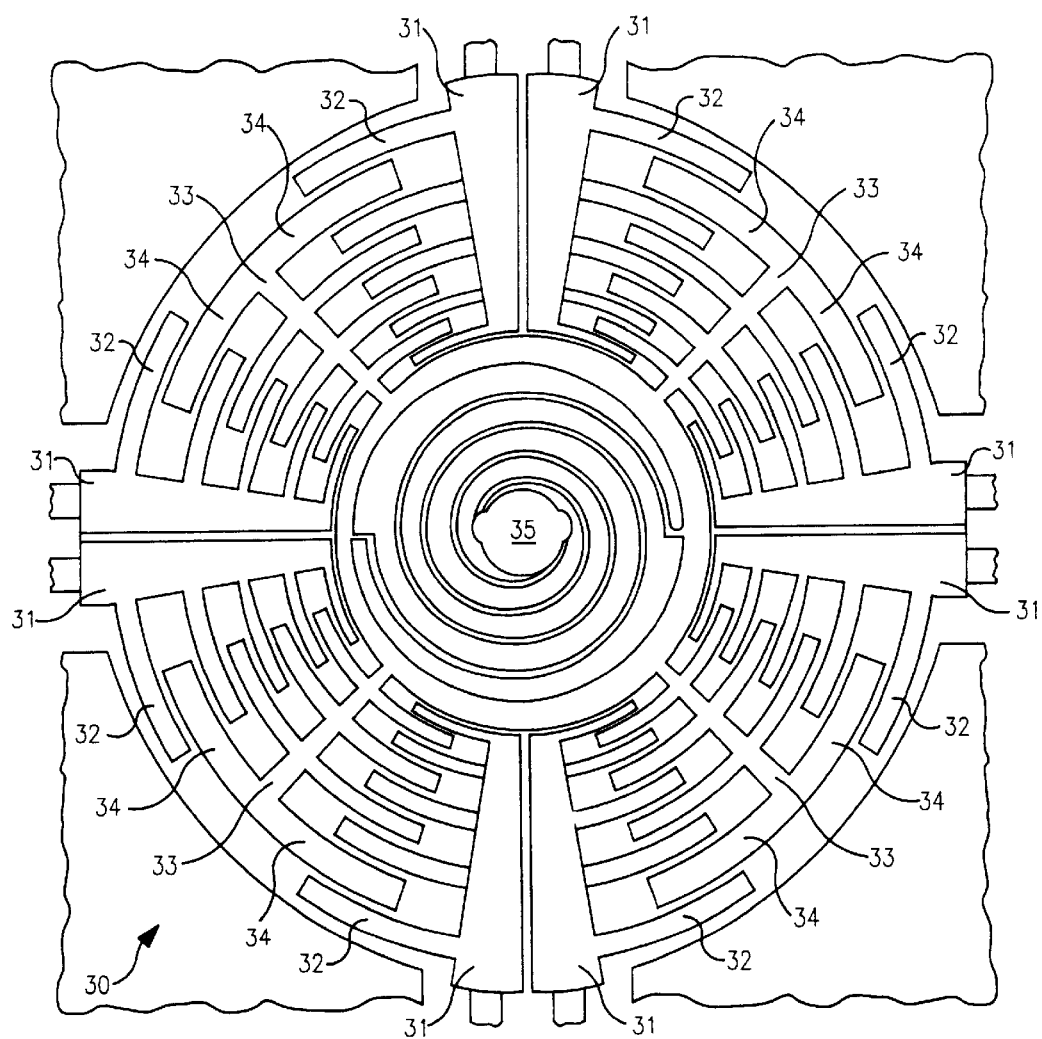
FIG. 3 shows a conventional arrangement of electrode fingers and branches for a rotary microactuator.
Figure 4:
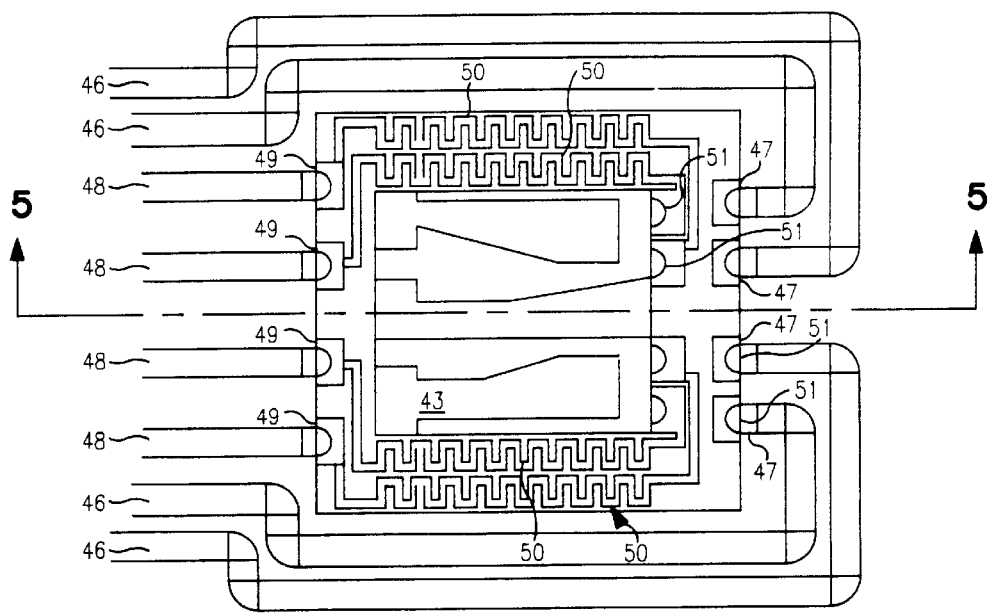
FIG. 4 shows a top view of a microactuator having microfabricated conducting cantilever wires according to the present invention.
Figure 5:
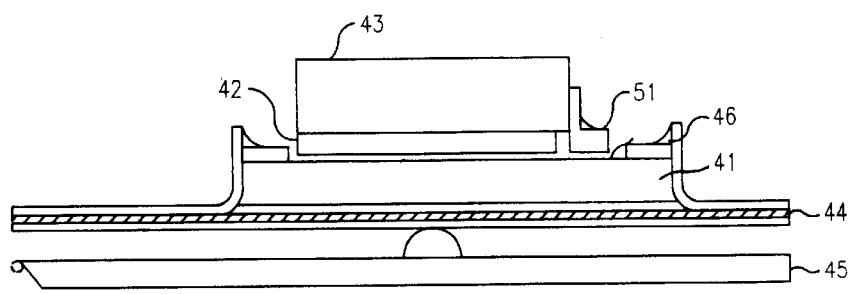
FIG. 5 shows a cross-sectional view along view A—A of the microactuator of FIG. 4.

FIG. 4 shows a top view of a microactuator device 40 having microfabricated conducting cantilever wires according to the present invention. FIG. 5 shows a cross-sectional view of microactuator 40 along view A—A in FIG. 4. Preferably, microactuator 40 is a rotary microactuator having high lateral stiffness so sensitivity of the microactuator to shock loading in the plane of the disk (FIG. 1) is minimized. Microactuator device 40 includes a stationary structure (not shown in FIG. 4 or 5 for clarity) formed on a substrate 41 and a moveable structure 42 that is attached to the stationary structure by a flexure (not shown in FIGS. 4 and 5 for clarity). Moveable structure 42 is attached to pico-slider 43 in a well-known manner. Microactuator substrate 41 is attached to a gimbal structure 44 in a well-known manner. A load beam 45 that is part of a suspension supports gimbal structure 44 for vertical (thrust) loads.

Traces 46 are connected to substrate 41 at solder connections 47 and connect voltage signals, such as drive signals, to and/or from the stationary electrode. Traces 48 are connected to substrate 41 at solder connections 49 and connect voltage signals, such as drive signals or write signals to or read signals from moveable structure 42.

Cantilever wires 50 are connected between solder connections 49 on microactuator substrate 41 and solder connections 51 on moveable electrode 42. Solder connections 51 on movable structure 42 are formed by a solder reflow method. According to the invention, the end of a cantilever wire 50 that is nearest solder connection 49 is anchored to microactuator substrate 41, and is "free" with respect to substrate 41 at the end of the cantilever wire that is nearest solder connection 51.

Cantilever wires 50 are microfabricated to have dimensions that are precisely defined so that the spring stiffness provided by wires 50 is precisely controlled and used as part of the microactuator flexure design. Cantilever wires 50 are preferably made of a plated metal formed by stencil plating having a serpentine shape. The stencil mold is formed by a polymer, such as photoresist, polyimide or PMMA, that is defined by a lithography, a deep etching, or an LIGA process. A sacrificial layer is formed on microactuator substrate 41 from silicon oxide or another material, such as alumina, that can be selectively removed by an etching process. The cantilever wire is formed on top of the sacrificial layer by stencil plating. The sacrificial layer is then removed from below the cantilever wire by an etching process so in such a manner that the cantilever wire is anchored to substrate 41 only in the vicinity of solder connection 49, and is not anchored or attached to substrate 41 in the vicinity of solder connection 51.

Figure 6:
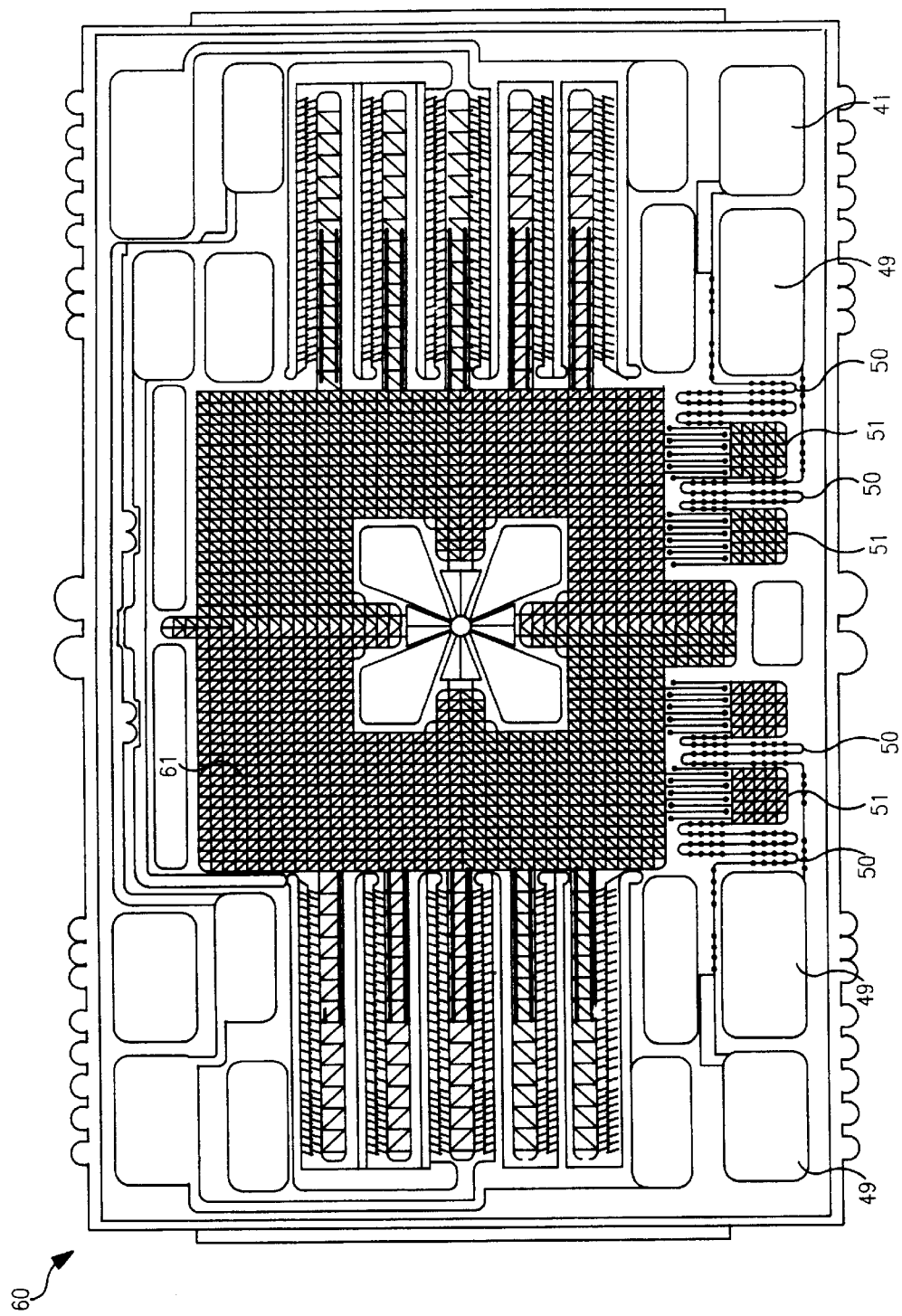
FIG. 6 shows a preferred embodiment of a microactuator according to the present invention.
Figure 7:
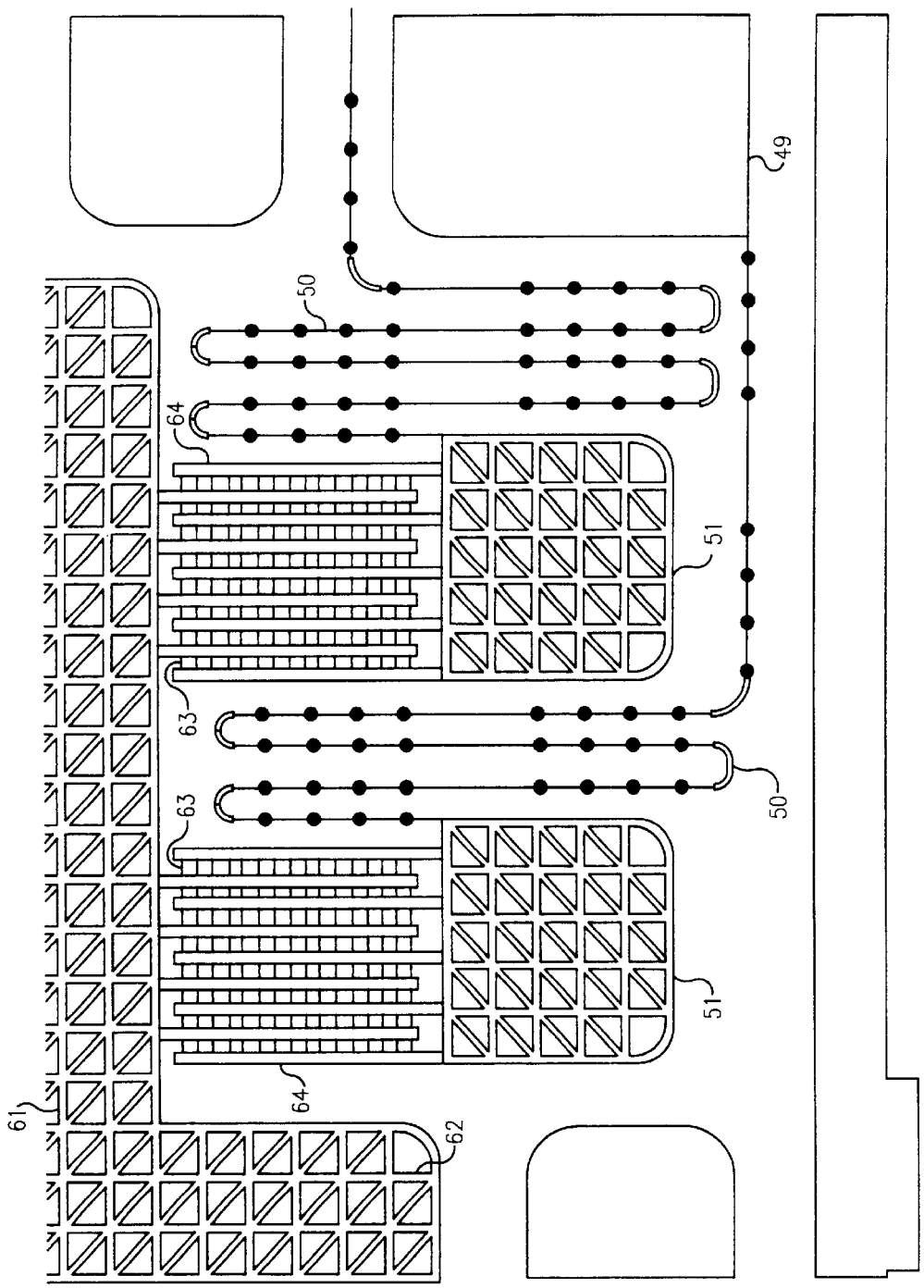
FIG. 7 shows an enlarged view of suspended pads, flexible wires and a portion of a stationary pad shown in FIG. 6.
Figure 8:
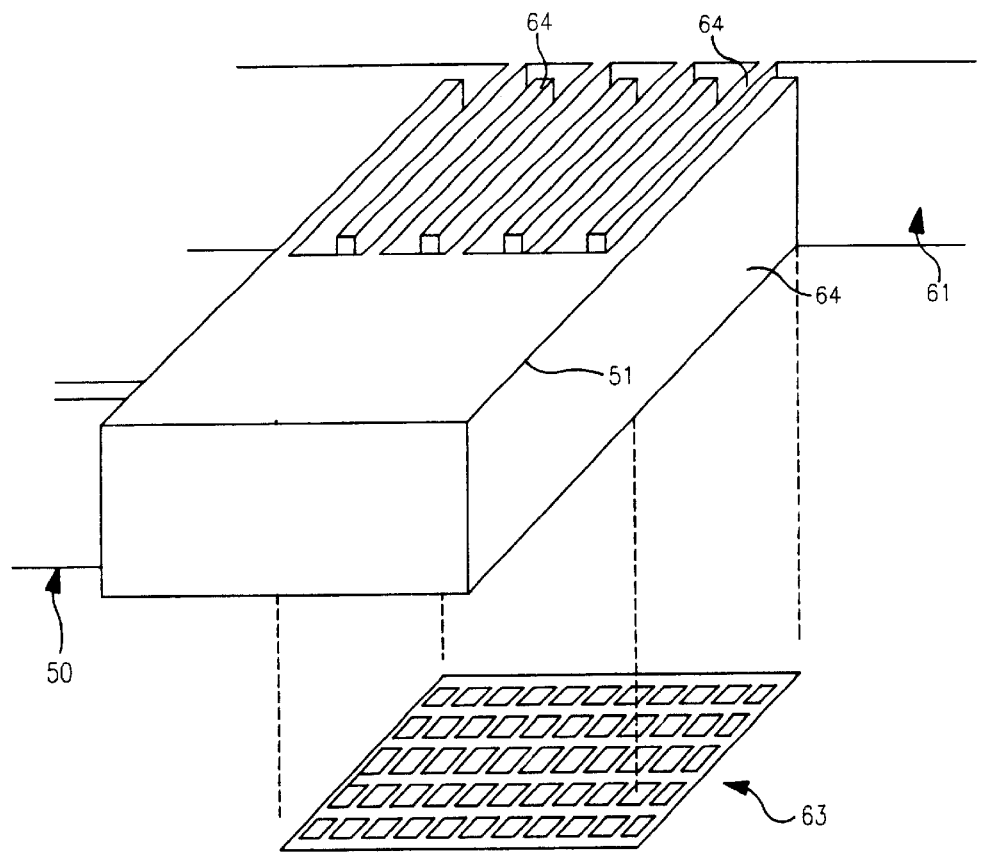
FIG. 8 shows details of the dielectric support shown in FIG. 7.

FIG. 6 shows a preferred embodiment of a microactuator 60 according to the present invention. Movable structure 61 includes suspended solder pads 51. Each pad 51 is connected to a stationary pad 49 through a flexible wire 50. FIG. 7 shows an enlarged view of suspended pads 51, flexible wires 50 and a portion of a stationary pad 49. In this embodiment, the structure framework of movable structure 61 and pads 51 are formed from metal 62. A dielectric support structure 63 is attached to the bottom of support bars 64 of movable structure 61 and solder pads 51 for providing mechanical support for a pad 51. FIG. 8 shows details of how dielectric support 63 is attached to support bars 64. Without support 63, a pad 51 would only be supported by a flexible wire 50, and could become stuck on the microactuator substrate caused by a meniscus force (stiction) during a release-dry process. A dielectric material is used for support 63 so that solder pads 51 can have an electrical potential that is different from the movable structure 61 of the microactuator 60, which is preferably grounded.

The present invention also provides a microfabricated shielding structure for physically and electrically isolating active electrodes of an electrostatic microactuator, thereby eliminating the possibility that small particles will be attracted to the microactuator electrodes. The shielding structure of the present invention also operates as an electrode stiffener, thus reducing the required minimum electrode width for the movable structure of a microactuator, and thereby increasing the area efficiency and output of the microactuator.

Figure 9:
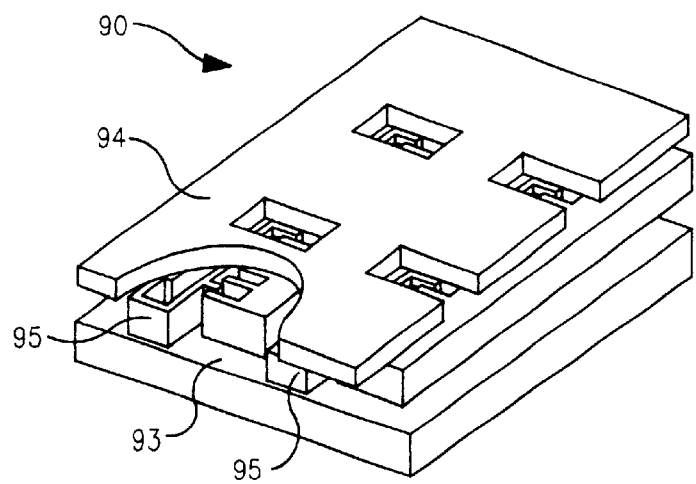
FIG. 9 shows a perspective view of a shielding structure of the present invention.
Figure 10:
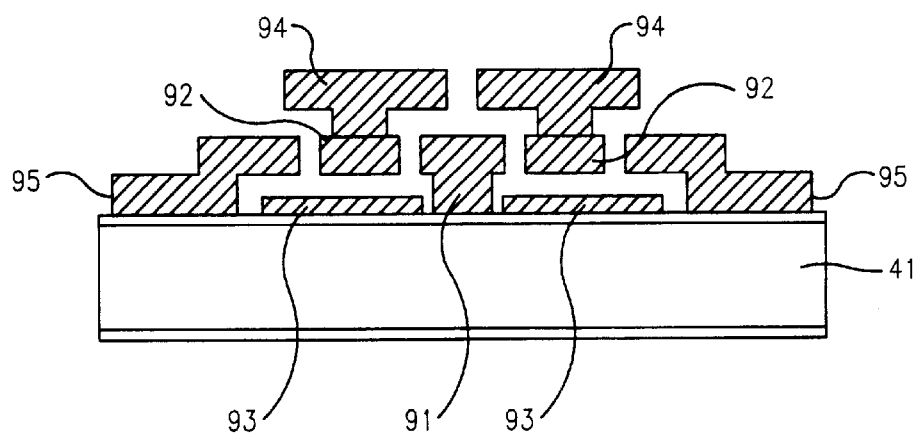
FIG. 10 shows a cross-sectional view of an exemplary microactuator having a shielding structure according to the present invention.

FIG. 9 shows a perspective view of a shielding structure 90 of the present invention. FIG. 10 shows a cross-sectional view of an exemplary microactuator having a single stationary electrode 91 that is shielded by a shielding structure according to the present invention. Shielding structure 90 includes the electrodes 92 of a movable portion of a microactuator, a lower electrically conducting layer 93 and an upper electrically conducting layer 94. According to the invention, the active electrodes of the microactuator are the stationary electrodes, of which only one stationary electrode 91 is shown in FIG. 10. The stationary electrodes of a microactuator are completely enclosed inside shielding structure 90.

A plurality of areas of lower electrically conducting layer 93 are formed on substrate 41 and are electrically isolated from each stationary electrode 91. Upper electrically conducting layer 94 is connected to all of the movable electrodes 92, and operates as a stiffener for eliminating microactuator structure vibration modes that can arise from vibrations of individual electrodes. An electrically conducting edge structure 95 is formed at the outside edges of the microactuator so that the electrical fields generated between the stationary electrodes and the movable electrodes are contained within shielding structure 90. Each component forming shielding structure 90 is electrically connected to a signal common, such as a ground potential. Top layer 94 of shielding structure 90 can be used as a bonding platform for attaching a microactuator to a magnetic recording head slider.

Figure 11:
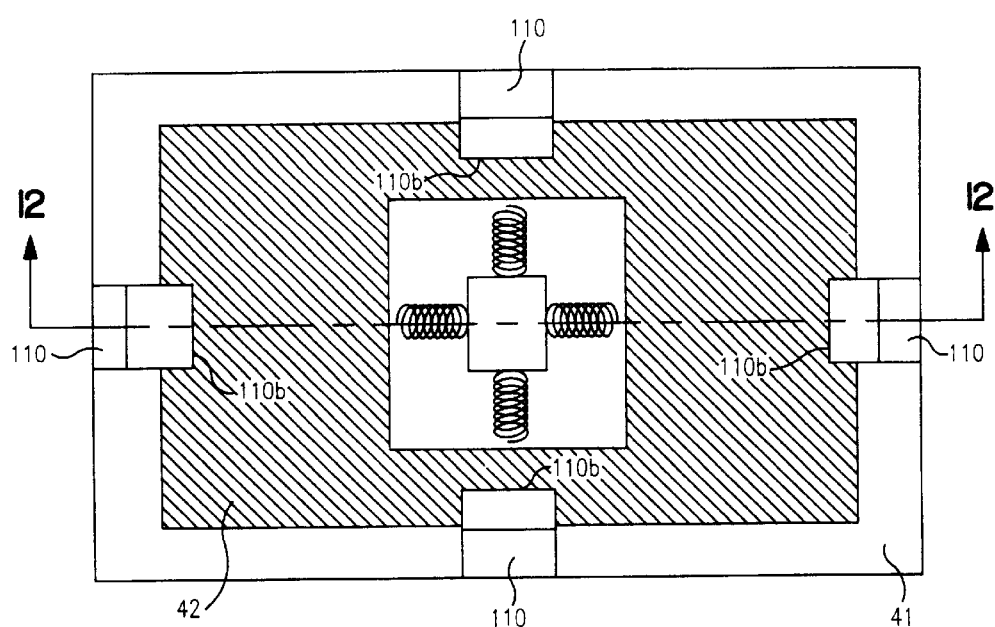
FIG. 11 shows a top view of an exemplary microactuator having in-plane and out-of-plane limiters according to the present invention.
Figure 12:
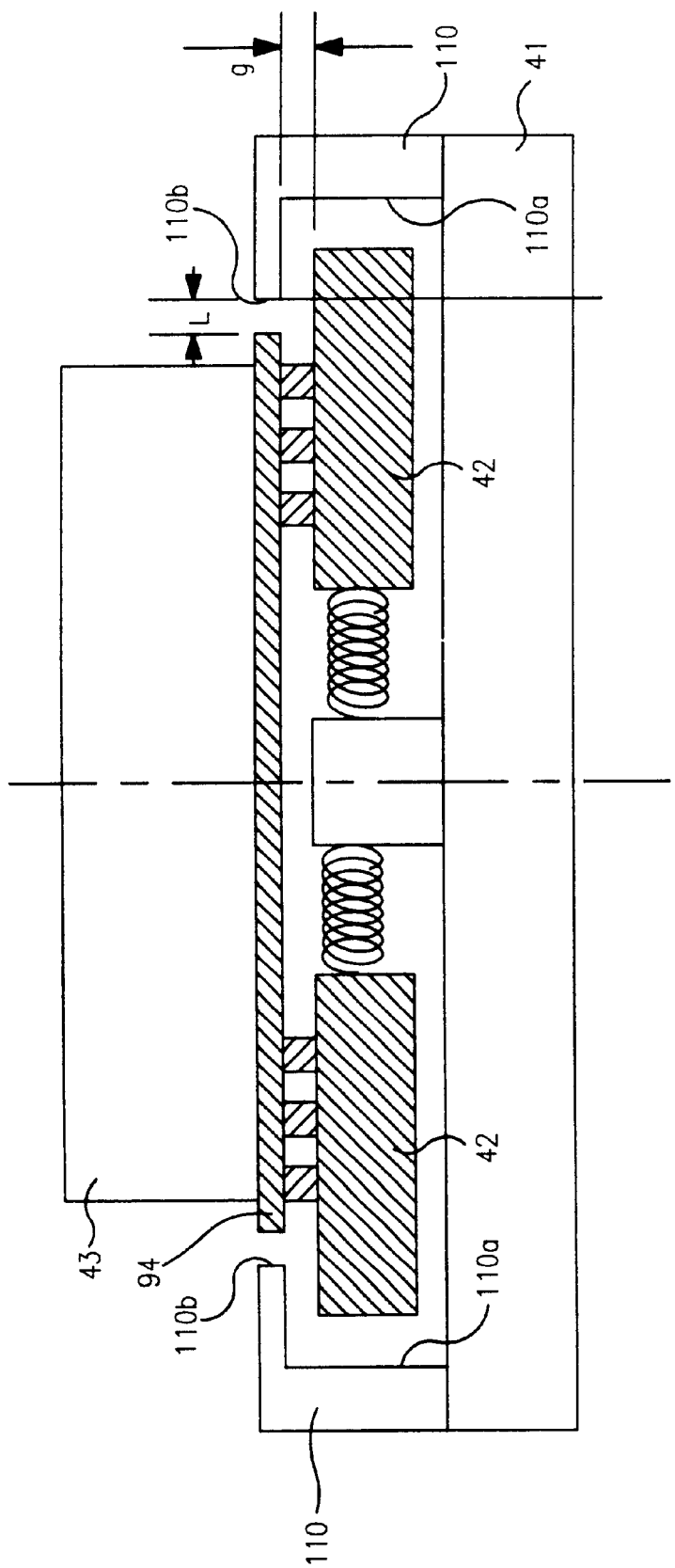
FIG. 12 shows a cross-sectional view of the exemplary microactuator of FIG. 11 along line A—A.

The present invention provides a microfabricated limiter structure for preventing a flexure of a microactuator from deformation that exceeds the safe stress limit for the flexure. FIG. 11 shows a top view of an exemplary microactuator having a plurality of in-plane and out-of-plane limiters 110 according to the present invention. FIG. 12 shows a cross-sectional view of the exemplary microactuator of FIG. 11 along line A—A. Each limiter 110 includes an in-plane limiter surface 110*a* and an out-of-plane limiter surface 110*b*. Each limiter 110 is anchored to substrate 41 in a well-known manner at predetermined points so that movement of movable component 42 parallel to the surface of substrate 41 is limited to a predetermined inplane distance L by contact with an in-plane limiter surface 110*a*. Out-of-plane limiter surface 110*b* extends above movable component 42 so that movement of movable component 42 away from the surface of substrate 41 is limited by surface 110*b* to a predetermined out-of-plane distance g by contact with movable component 42. In-plane limiter surface 110*a* and out-of-plane limiter surface 110*b* also limit any rocking motion experienced by movable component 42.

Limiters 110 can be formed from a dielectric material in a well-known manner, or, preferably, can be a conductive material, such as plated metal formed by stencil plating. The stencil mold is formed by a polymer, such as photoresist, polyimide or PMMA, that is defined by a lithography, a deep etching or an LIGA process. Limiters 110 can be formed at the time the microactuator is formed using the same fabrication steps used for fabricating a microactuator so that no additional masking steps are added to the fabrication process. When limiters 110 are formed from a plated metal, limiters 110 can also operate as a conducting edge structure 95 (FIG. 10) of a shielding structure 100 formed at the outside edges of the microactuator so that the electrical fields generated between the stationary and movable electrodes are contained within shielding structure 90.

To provide an area-efficient microactuator, the present invention uses a non-radial electrode branch in that electrode branches are located to satisfy the second design constraint described above in which each electrode branch of the movable part of a microactuator is separated from an adjacent branch of the movable part of the microactuator by a minimum-required distance along the length of the branches so that the area-efficiency of the microactuator is minimized. The minimum-required distance between a movable branch and an adjacent stationary branch is based on the electrostatic attractive force occurring between the movable branch and the adjacent stationary branch that is in a direction that is opposite from the direction that the movable branch is driven, and the minimum length of the fingers necessary for producing a position-independent electrostatic force. The necessary length of the fingers is shorter in the region closer to the center, and is longer in the region further from the center because the translational stroke of a finger is proportional to the distance of the finger from the center of rotation. Consequently, the separation distance between two adjacent branches can be relatively smaller in a region of a microactuator closer to the center of rotation, and relatively larger in a region that is farther from the center of rotation. The first design constraint described above is satisfied by attaching fingers to a branch at different angles depending upon the relative position of the finger on a branch and with respect to the center of rotation.

Figure 13:
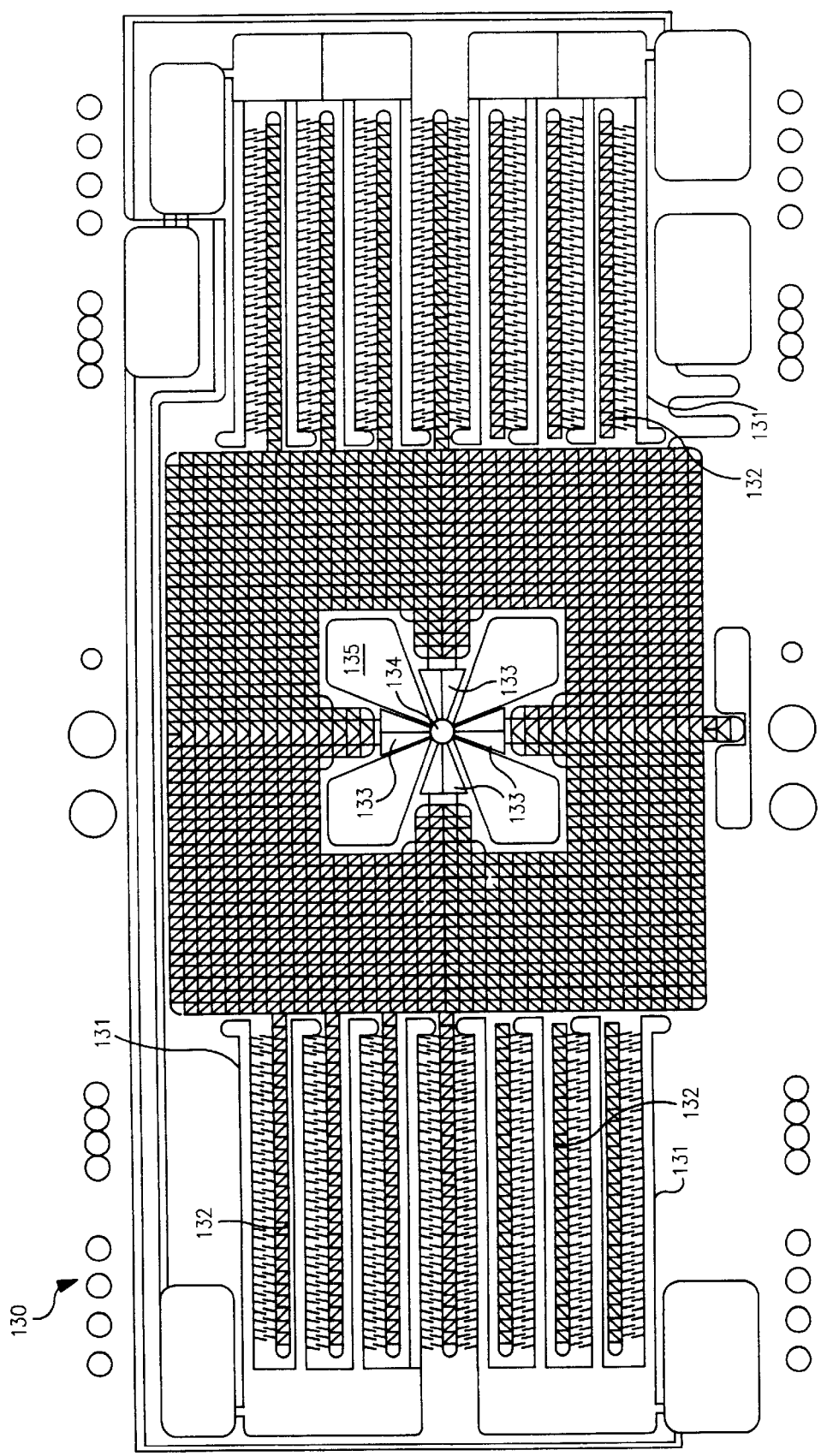
FIG. 13 shows another preferred embodiment of a microactuator using a parallel electrode branch design according to the present invention.

FIG. 13 shows another preferred embodiment of a microactuator 130 using a parallel branch design according to the present invention. Microactuator 130 includes a stationary structure having branches 131 that are formed on a substrate (not shown) and a movable structure having branches 132. The movable structure is attached to the stationary structure by a flexure member formed from a plurality of flexure elements 133 so that the movable structure moves about a center of rotation 134. Each of the stationary structure branches 131 are parallel to an adjacent stationary structure branch 131. Similarly, each of the movable structure branches 132 are parallel to an adjacent movable structure branch 132. In other words, the distance between two adjacent stationary branches 131 remains constant for the entire length of the branches 131, and the distance between two adjacent movable structure branches remains constant along the entire length of branches 132. Both branches 131 and 132 have electrode fingers that are attached at the proximal end of a finger at an angle that is substantially perpendicular to a straight line between the proximal end of the finger and the center of rotation 134 of microactuator 130. The preferred embodiment of a microactuator shown in FIG. 6 also uses a parallel branch design according to the present invention.

Flexure elements 133 forming the flexure member are a spring mechanism that connects the stationary part of microactuator 130 to the movable part. Preferably, flexure elements 133 are stiff in a translational direction of microactuator 130, while simultaneously being flexible in the rotational direction of microactuator 130. Further, it is preferable to use the shortest possible flexure element for further minimizing the area of a microactuator. To achieve the required rotational flexibility, it is optimum to place the branches as close as possible to the center of the rotation because the rotational spring constant is proportional to the square of the distance from the center of rotation to the position of the spring.

Flexure elements 133 are each attached to an attachment surface 136 of an attachment structure 135. Attachment structure 135 is part of the stationary structure and has an area that includes the center of rotation 134 of the movable structure. According to the invention, the distance between the center of rotation and the point on the stationary structure where one end of a flexure element is attached is shorter than the length of the flexure element. As a result, flexure elements 134 provide a relatively low rotational stiffness, while also minimizing the total area of the microactuator required for generating a sufficient torque.

Another benefit obtained from the flexure member of the present invention is the insensitivity of the spring constant to internal stress caused by, for example, a residual film stress or a thermal expansion mismatch. The complete movable part expands with the same rate and, consequently, no tension or compression is applied to the branches.

While the present invention has been described in connection with the illustrated embodiments, it will be appreciated and understood that modifications may be made without departing from the true spirit and scope of the invention.

What is claimed is:

1. A microactuator, comprising:
   a stationary structure formed on a substrate;
   a movable structure;
   at least a first pair of wires connected to the movable structure, the first pair of wires conducting a signal associated with the movable structure, each wire of the first pair of wires having a first end that is connected in a cantilever manner to the substrate and a second end that is connected to the movable structure, each wire of the first pair of wires having a serpentine shape between the first end and the second end;
   a magnetic head slider attached directly to the movable structure; and
   at least a second pair of wires conducting a signal associated with a magnetic head of the slider, each wire of the second pair of wires having a first end that is connected in a cantilever manner to the substrate and a second end that is connected to the movable structure, each wire of the second pair of wires having a serpentine shape between the first end and the second end of the wire.

2. The microactuator according to claim 1, wherein each wire of the first pair of wires has a predetermined spring stiffness.

3. The microactuator according to claim 2, wherein each wire of the first pair of wires has a predetermined electrical characteristic.

4. The microactuator according to claim 3, wherein the microactuator is a rotary microactuator.

5. The microactuator according to claim 1, further comprising electronic circuitry connected to one of the wires of the second pair of wires, the electronic circuitry being fabricated as part of the substrate and conditioning electrical signals associated with the magnetic head.

6. The microactuator according to claim 5, wherein the electronic circuitry amplifies electrical drive signals associated with the magnetic head.

7. The microactuator according to claim 5, wherein the electronic circuitry is a recording sensor preamplifier.

8. The microactuator according to claim 5, wherein the electronic circuitry provides ESD protection for the electrical signals associated with the magnetic head.

9. The microactuator according to claim 1, further comprising:
   a flexure mechanically connecting the stationary structure to the movable structure; and
   a plurality of limiters anchored to the substrate, each limiter having an in-plane limiter portion and an out-of-plane limiter portion, the in-plane limiting portion limiting movement of the movable structure in a direction parallel to a surface of the substrate to a predetermined in-plane distance, and the out-of-plane portion limiting movement of the movement of the movable structure to a predetermined out-of-plane distance.

10. A disk drive, comprising:

a magnetic disk having a plurality of tracks;

a voice coil motor coarsely positioning a read/write head over a selected track; and a microactuator finely positioning the read/write head over the selected track, the microactuator including, a stationary structure formed on a substrate;

a movable structure;

at least a first pair of wires connected to the movable structure, the first pair of wires conducting a signal associated with the movable structure, each wire of the first pair of wires having a first end that is connected in a cantilever manner to the substrate and a second end that is connected to the movable structure, each wire of the first pair of wires having a serpentine shape between the first end and the second end;

a magnetic head slider attached directly to the movable structure of the microactuator; and at least a second pair of wires conducting a signal associated with a magnetic head of the slider, each wire of the second pair of wires having a first end that is connected in a cantilever manner to the substrate and a second end that is connected to the movable structure, each wire of the second pair of wires having a serpentine shape between the first end and the second end of the wire.

11. The disk drive according to claim 10, wherein each wire of the first pair of wires has a predetermined spring stiffness.

12. The disk drive according to claim 11, wherein each wire of the first pair of wires has a predetermined electrical characteristic.

13. The disk drive according to claim 12, wherein the microactuator is a rotary microactuator.

14. The disk drive according to claim 10, wherein the microactuator further includes electronic circuitry connected to one of the wires of the second pair of wires, the electronic circuitry being fabricated as part of the substrate and conditioning electrical signals associated with the magnetic head.

15. The disk drive according to claim 14, wherein the electronic circuitry amplifies electrical drive signals associated with the magnetic head.

16. The disk drive according to claim 14, wherein the electronic circuitry is a recording sensor preamplifier.

17. The disk drive according to claim 14, wherein the electronic circuitry provides ESD protection for the electrical signals associated with the magnetic head.

18. The disk drive according to claim 10, wherein the microactuator further includes, a flexure mechanically connecting the stationary structure to the movable structure; and a plurality of limiters anchored to the substrate, each limiter having an in-plane limiter portion and an out-of-plane limiter portion, the in-plane limiting portion limiting movement of the movable structure in a direction parallel to a surface of the substrate to a predetermined in-plane distance, and the out-of-plane portion limiting movement of the movement of the movable structure to a predetermined out-of-plane distance.

* * * * *